United States Patent [19]

Miano et al.

[11] 3,931,824

[45] Jan. 13, 1976

[54] SMOKING MATERIALS

[75] Inventors: Ralph R. Miano; Charles H. Keith, both of Charlotte, N.C.

[73] Assignee: Celanese Corporation, New York, N.Y.

[22] Filed: Feb. 14, 1975

[21] Appl. No.: 550,081

Related U.S. Application Data

[63] Continuation of Ser. No. 395,500, Sept. 10, 1973, abandoned, which is a continuation of Ser. No. 52,725, July 6, 1970, abandoned, which is a continuation-in-part of Ser. No. 774,834, Nov. 1, 1968, abandoned, which is a continuation-in-part of Ser. No. 696,699, Jan. 10, 1968, abandoned.

[52] U.S. Cl. .................................. 131/2; 131/17 R
[51] Int. Cl.² ...................... A24B 15/00; A24D 1/18
[58] Field of Search ........ 131/2, 17 R, 15, 140–144,

[56] References Cited
UNITED STATES PATENTS

| | | | |
|---|---|---|---|
| 2,734,513 | 2/1956 | Hungford et al. | 131/15 C |
| 2,809,904 | 10/1957 | Koree | 131/2 |
| 2,930,720 | 3/1960 | Finberg | 131/17 R |
| 2,971,517 | 2/1961 | Pihl | 131/15 C |
| 3,003,895 | 10/1961 | Grunwald | 131/2 |
| 3,106,210 | 10/1963 | Reynolds et al. | 131/17 R |
| 3,125,098 | 3/1964 | Osborne | 131/140 C |
| 3,162,200 | 12/1964 | Jansson et al. | 131/17 AC |
| 3,461,879 | 8/1969 | Kirkland | 131/2 |
| 3,477,865 | 11/1969 | Armbrust et al. | 131/17 R |
| 3,529,602 | 9/1970 | Hind et al. | 131/2 |

FOREIGN PATENTS OR APPLICATIONS

| | | | |
|---|---|---|---|
| 1,055,473 | 1/1967 | United Kingdom | 131/2 |

*Primary Examiner*—Robert W. Michell
*Assistant Examiner*—V. Millin
*Attorney, Agent, or Firm*—Thomas J. Morgan; Pamela D. Kasa

[57] ABSTRACT

A synthetic material adapted for use in smoking products which, upon combustion, yields a lower amount of smokestream components which may be deleterious to the smoker than does tobacco, while having an acceptable smouldering rate and taste is prepared by the combination of a combustible material, such as carboxymethyl cellulose with a portion of a filler material.

19 Claims, No Drawings

SMOKING MATERIALS

The present application is a continuation of Ser. No. 395,500, filed Sept. 10, 1973, now abandoned, which, in turn, is a continuation of Ser. No. 52,725, filed July 6, 1970, now abandoned, which, in turn, is a continuation-in-part of Ser. No. 774,834, filed Nov. 1, 1968, now abandoned which in turn, is a continuation-in-part of Ser. No. 696,699, filed Jan. 10, 1968, now abandoned entitled "Smoking Materials".

The present invention relates generally to smoking products and more specifically to synthetic materials suitable as tobacco substitutes.

It is well known that tobacco smoking, while a widespread practice, may tend to have undesirable effects on the smoker's health. These effects are believed to be attributable to the presence in the tobacco smoke of various components, which if inspired in significant amounts over a period of time may yield harmful effects. For a considerable number of years, attempts have been made to reduce amounts of these components in tobacco smoke. Recent emphasis by governmental agencies has resulted in increased activity in this area.

Essentially, two approaches have been taken in attempting to find a solution to this problem. First, attempts have been made to remove certain components by filtration of the smoke through a material such as paper or cellulose acetate filaments.

To date, the most significant gains in overcoming the aforesaid problem have been achieved by this technique.

A second approach to solving this problem is to substitute for all or a portion of the tobacco a meterial which yields a smoke containing a lower amount of undesirable components than the amount of components in a comparable quantity of tobacco smoke. In addition to exhibiting a reduced delivery of undesirable smokestream components, an effective tobacco substitute must also have a smouldering rate comparable to tobacco. In addition, the smoke from the synthetic material must not have an undesirable taste.

Earlier substitutes have fallen into two categories. In the first group are materials having an acceptable smouldering rate, but which fail to give any significant reduction in undesirable components. In the second group are materials which give some degree of reduction of harmful components when blended with tobacco in small percentages, but which have an undesirable taste and/or do not burn satisfactorily when used alone or in significant percentages in tobacco blends.

It is an object of the present invention to provide a smoking material which yields a smoke having a substantially lower amount of undesirable components than tobacco smoke, while at the same time having an acceptable taste and smouldering rate.

It is another object of the present invention to provide a process for preparing a smoking material of the aforesaid nature.

It is yet another object of the present invention to provide a cigarette containing entirely or in significant percentages, a synthetic smoking material exhibiting the aforesaid properties.

Another object is to provide a synthetic material adapted for incorporation in a smoking composition as a substitute for less desirable materials such as tobacco.

Other objects of the present invention if not specifically set forth herein, will be obvious to one skilled in the art from a reading of the present specification.

In general, it has been discovered that a composition comprising an intimate mixture of a combustible material of the type hereinbelow defined and a particular filler in amounts specified herein fulfills the aforesaid requirements.

More specifically, the combustible materials employed in the present invention are selected from the group consisting of starch, and starch and cellulose derivatives including salts thereof containing the recurring anhydroglucose unit

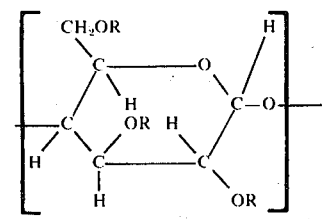

wherein at least one R is selected from the group consisting of lower alkyl, hydroxy lower alkyl, carboxy alkyl groups, and mixtures thereof, and the remaining R's are hydrogen atoms. Preferably, R, is selected from the group consisting of $CH_2COOM$, $CH_2CH_2OH$ and $CH_3$; in which M is a non-toxic cation or hydrogen, and preferably is selected from the group consisting of alkali metal and alkaline earth metals, aluminum, iron, and hydrogen. Compounds of the above nature ordinarily have an average degree of substitution for hydrogens of from about 0.2 to about 3.0 R groups per unit, and preferably have from about 0.4 to about 1.2 groups per unit. Mixtures of these compounds are also suitable in the present invention.

Combustible materials particularly suited for the purposes of the present invention are carboxymethyl cellulose, carboxy ethyl cellulose, hydroxyethyl cellulose, carboyxmethyl hydroxyethyl cellulose, methyl cellulose, carboxymethylated starch, analogous compounds such as ethyl cellulose, hydroxypropyl cellulose, carboxy ethyl starch and the like.

The combustible material may be cross-linked to improve its processability characteristics and reduced solubility through reaction of some or all residual hydroxyl groups with a cross-linking agent. Cross-linking agents such as dimethylol ureaformaldehyde resins, melamine formaldehyde resins; Kymene 557, a polyamide epichlorohydrin manufacatured by Hercules; glyoxal; and dialdehyde starch are particularly useful for this purpose. Up to about 5% and preferably about 0.001% to about 0.5% based on the total weight of the composition is suitable for this purpose. Also, cross-linking may be obtained through the use of organic salts or halides having a divalent or trivalent ion such as iron or aluminum. Also, the material may exist in finished form in a modified state as a result of interaction with metallic ions in tobacco pectins or the like, or even conventional tobacco additives such as humectants, reconstituted materials, etc.

The filler material employed in the present compositions are non-toxic particulate materials, preferably having an average minimum dimension of from about 0.2 microns to about 1.0 millimeter. Even more preferably, the particles will have an average minimum dimension of from about 0.05 millimeters. It is also preferred that the particulate materials have a maximum dimension of about 0.25 mm, and more preferably, about 0.10 mm. Suitable materials can be selected from organic compounds, inorganic compounds and the elements, so long as the material selected is non-toxic, i.e., pharmacologically inactive in the sense of significant adverse effects in a causative relationship upon oral ingestion of the substance itself or its combustion products. However, a reduced delivery of undesirable components is more readily observed when the particulate material comprises an inorganic compound, an element or a mixture thereof.

While not wishing to be held to any particular theory, it is believed that the rate of combustion of the present compositions is related to the thermal conductivity coefficient of the filler material employed. That is, a material having a relatively high thermal conductivity coefficient will tend to transfer heat to adjacent particles, thus maintaining smouldering of the combustible material. Of course, the density of particles will determine to a degree the preferred thermal conductivity coefficient of the final smoking product. An increased particle density will tend to promote combustion until there is no longer sufficient combustible material to support smouldering. Generally, however, filler materials having an equivalent thermal conductivity coefficient of the dense, particulate filler at 800°C of greater than $6 \times 10^{-3}$ calories cm/sec °C cm² are preferred in the present invention. It should be mentioned, however, that this factor may not be entirely applicable to decomposable salts, although those salts may have independently desireable characteristics, as noted herein below. Thermal conductivity coefficients are readily obtainable by passing heat through a thin bed of the material to be tested and measuring the rise in the temperature of the bed. This technique is more completely described by W. J. Kingery et al. in the *Journal of the American Ceramic Society*, 37:107 (1954). Also, specific thermal conductivity coefficients are readily available from the literature. Exemplary coefficients are: $8.2 \times 10^{-3}$ calories cm/sec ° C cm² for titanium dioxide, $22.1 \times 10^{-3}$ calories cm/sec ° C cm² for magnesium oxide, $7.5 \times 10^{-3}$ calories cm/sec ° C cm² for fused silica, and $5.1 \times 10^{-3}$ calories cm/sec ° C cm² for zirconium dioxide.

Inorganic compounds which may be used as filler may be comprised of a cation selected from Column (A) and an anion selected from Column (B).

| (A) | | (B) | |
|---|---|---|---|
| Lithium | Manganese | Silicon | Oxides |
| Sodium | Aluminum | Palladium | Hydrated Oxides |
| Potassium | Cerium | Tin | Hydroxides |
| Cesium | Cobalt | Zinc | Carbonates |
| Magnesium | Iron | Titanium | Phosphates |
| Calcium | Molybdenum | Zirconium | Aluminates |
| Strontium | Nickel | Copper | Stannates |
| Barium | Rubidium | | Zincates |
| | | | Silicates |
| | | | Carbides |

Preferably, the cations employed will be selected from the group consisting of zinc, titanium, magnesium, calcium, aluminum, and iron. Desirably, these cations are in the form of the carbonates, oxides, hydroxides, sulfates, phosphates, aluminates, silicates and alumino silicates. The oxides, carbonates and hydroxides are particularly desirable since these anions decompose to carbon, hydrogen and oxygen upon combustion. Inorganic compounds in their natural occurring states, such as dolomite, diatomaceous earth, perlite, magnesite, vermiculite, etc. are also suitable.

As previously noted, elements may also be used as filler materials. Preferred elements include carbon, zinc, magnesium, titanium, aluminum, and iron.

While the filler materials are generally granular in nature, they may also be in fibrous form. Materials readily useable in fibrous form are fiberglass, mica, asbestos, metal, metal oxide, and metal carbide whiskers. For the purposes of the present invention, thin metal strips such as aluminum shaving are considered to be fibrous. Preferably the fibrous materials will have an average length of from about 0.1 mm. to about 5 mm., and an average minimum dimension of the magnitude previously noted.

In order to obtain a smouldering rate comparable to tobacco, the aforesaid ingredients are generally combined in a ratio of from about 85:15 to about 15:85, and preferably, in a ratio of from about 25:75 to about 75:25. Combination of these materials and these ratios generally yields a material having a smouldering rate comparable to tobacco when smoked under analogous conditions; that is, about 3–10mm/minute in conventional cigarette form. A smouldering rate of this magnitude corresponds to a puff count of about 12–5 in a cigarette smoked on a 60 second cycle. It is to be expected, however, that specific compositions will have different combustion rates, particularly when filler materials having different thermal conductivity coefficients are used.

It is also within the scope of the present invention to employ combinations of particulate fillers in order to obtain the ultimate smouldering rate desired. Fillers found to be particularly suitable in controlling smouldering rates include titanium dioxide, carbon, magnesium oxide, zeolite, silica gel, magnesium silicate, and diatomaceous earth.

The compositions of the present invention are suitable in the form of an intimately mixed state, in the form of a film, or in some physical state between these two extremes. It is preferred from the standpoint of processing and convenience of smoking that the compositions be in film form when the smokable product consists of solely the present smoking material. When the present compositions are blended with tobacco, or with a suitable support medium as later defined, however, mixtures are equally preferred. As an example of the above intermediate state of the composition, it is possible to use the defined combustible material as a bonding agent and bond the filler particles to the surfaces of the tobacco or other support medium.

Films are generally prepared by adding all of the desired ingredients to water, intimately mixing the materials and casting the mixture onto a suitable surface. The mixture at the time of casting will ordinarily contain about 65 to about 95% water. Percentages of water outside of this range are possible, but increased processing difficulties result. Generally, the film will be cast to a dried thickness of from about 2 to about 20 mils, preferably from abut 3 to about 10 mils, and even more preferably to about 5 mils. Such films are generally cut to a width of about 16–60 cuts per inch prior to use. Instead of water, organic solvents such as alcohols may also be used in some instances.

As earlier noted, the present materials in addition to being used alone, may also be blended with tobacco. Suitable smoking products can be prepared from any combination of tobacco and synthetic material. However, tobacco to synthetic material ratios of from about 95:5 to about 25:75 will generally be employed. The primary criterion, of course, is that sufficient synthetic material is present in the mixture to obtain a significant decrease in the amount of components delivered. Ordinarily, the synthetic material will be in the form of a film or a dry mixture, and will be tumbled with tobacco until a homogeneous mixture is obtained. However, it is possible to add an aqueous dispersion of the materials to tobacco, and tumble and dry the mixture to obtain filler particles adhered to tobacco with the combustible material acting as a bonding agent. Similarly, the present synthetic material may be combined in all proportions with other synthetic smoking materials.

When the present material is in film form, desirable products can also be produced by uniformly incorporating into the film minor amounts of a second combustible material. Such materials include tobacco dust; sodium gluconate; pectins; natural gums, e.g., guar gum; cellulose and oxidized cellulose. To preserve film integrity and maintain filling power of the film, this optional second combustible material may be used in an amount of from zero to 40% of the total product with up to 30% being preferred.

Combinations of the present materials within the specified ratios will generally produce a smoking material yielding an ash comparable to that of tobacco. If desired, however, the type of ash formation and appearance thereof can be readily modified by the addition of various substances as fiberglass, potassium salts, organic fibers, or phosphates, and non-toxic hydrated metal salts generally.

The materials of the preceeding nature produce a smoke which in itself is relatively odorless and tasteless. This property permits a wide range of modification of taste and odor by incorporating into the material a variety of flavorants. Exemplary materials which have been found to be desirable in modifying the taste and odor properties of the present smoking material include tobacco extracts, fruit extracts, synthetic flavorants, natural gums, resins, and sugars. Nicotine and other alkaloids, while not essential ingredients in the present compositions, may also be added in controlled amounts.

From an aesthetic standpoint, addition of various coloring agents to the smoking material may be desirable. For example, one may obtain a material having a color similar to natural tobacco by the addition of materials such as carbon, iron oxide, food dyes, tobacco extracts, organic colorants, and inorganic pigments, or mixtures thereof to the basic smoking materials. Of course, contrary to natural tobacco, one may make the present material any color desired. Generally, up to about 5.0% of coloring agent based on the total composition can be employed. Preferably, about 0.1 to about 2.0% of coloring agent is utilized.

When the present compositions are prepared in film form, incorporation of a plasticizer into the film in order to increase the flexibility thereof is often desirable. Plasticizers which have been found to be suitable for this purpose include water, butylene glycol, glycerol, and propylene glycol. From about 1 to about 30% and preferably, from about 2 to about 25% of plasticizer based on the total weight of the composition is ordinarily used.

Film formation may also be improved by adding a wetting agent such as Tween 20, a polyoxyethylene (20) sorbitan monolaurate manufactured by Atlas Chemical Industries, Inc.; Tergitol, TMN, a polyglycol ether of trimethyl nonanol manufactured by Union Carbide; or Germ-i-tol, an alkyl dimethyl ($C_{12}$–$C_{18}$) benzyl ammonium chloride manufactured by Fine Organics, Inc.; to the composition prior to preparation of the film. Preferably, about 0.05 to about 1.0% of wetting agent is employed, with up to 10% being suitable.

The smouldering rate of the present films is not only felt to be attributable to the thermal conductivity coefficient of the filler material employed, as earlier described, but also to the thermal conductivity of the film itself. Generally, it has been found that the films having the most desirable smouldering have a thermal conductivity of from about $3.7 \times 10^{-3}$ °C cm/sec. to about $5.0 \times 10^{-3}$ °C cm/sec. In testing the films of the present invention, data was obtained by placing a film of 12 mils in thickness between two aluminum blocks, maintaining one block at 117°C, and measuring the increase in temperature of the second block. Standardization was obtained by using in all instances a heat source which would increase the temperature of the second block at the rate of 0.19°C/sec when the blocks were placed in contact without the presence of an interposed film.

The following examples are presented as illustrative of the present invention and should not be construed as in limitation thereof.

EXAMPLE I

One hundred-forty ml. deionized water at 80°C was transferred to a high shear blender along with 12.6 g rutile, heavy grade titanium dioxide. The titanium dioxide was completely dispersed before 8.4 g medium molecular weight, 0.7 D.S., sodium carboxymethyl cellulose was slowly added to the vortex of the vigorously agitated water. After the CMC was completely dispersed (5–10 minutes; ca. 65°C), a film was cast on a Teflon coated fabric at 35 mils and dried in a circulating air oven at 125°C. After drying and conditioning (74°F/60%RH), the film is ready for shredding. The film was then shredded to an average width of 0.9 mm and an average length of 1.0 cm. Shredded films of the composition given below were formed into cigarettes of 8 mm in diameter and 85 mm in length by wrapping in cigarette paper on a hand roller.

Cigarettes thus prepared were smoked on an apparatus which took 35 ml. puffs over a 2 second interval on a 60 second cycle. Pressure drop, i.e., the flow resistance occurring when air was drawn through the column at the rate of 1050 ml/min. was determined. Tar weight was obtained by drawing the smoke from the cigarette through a Cambridge filter pad which removed at least 98% of the solid particulate matter and weighing the pad before and after smoking. Puff count is defined as the number of puffs required to smoke the cigarette to a 30 mm butt.

Table I sets forth the data obtained in comparison with analogous data obtained by smoking tobacco under the same conditions.

TABLE 1

| % TiO$_2$ | % CMC | Shred Weight (grams) | Pressure Drop | Puff Count | Wet Tar (mg/cigt) | Dry Tar (mg/cigt) |
|---|---|---|---|---|---|---|
| 30 | 70 | — | — | DNB* | — | — |
| 35 | 65 | 1.10 | 10 | 11.1 | 3.2 | 2.9 |
| 60 | 40 | 1.10 | 7 | 5.4 | 2.3 | 2.0 |
| 80 | 20 | 2.50 | 7 | 9.9 | 1.4 | 1.1 |
| 85 | 15 | — | — | DNB | — | — |
| (Tobacco) | | 1.10 | 70 | 10.0 | 28.7 | 24.7 |

*Did Not Burn

From the above data, it is apparent that a substantially reduced amount of tars is obtained when the present materials are substituted for tobacco.

EXAMPLE II

Films were prepared and tested in the manner of Example I with the exception that carboxymethyl hydroxyethyl cellulose and diatomaceous earth were used as the ingredients. The data obtained is set forth in Table 2.

TABLE 2

| % Diatomaceous Earth | % CMHEC | Shred Wgt.g | Pressure Drop | Puff Count | Wet Tar (mg/cigt) | Dry Tar (mg/cigt) |
|---|---|---|---|---|---|---|
| 20 | 80 | 1.10 | 15 | *N.B. | — | — |
| 25 | 75 | 1.10 | 15 | 9 | 15.6 | 13.4 |
| 75 | 25 | 1.10 | 15 | 5 | 2.25 | 1.4 |
| 89 | 11 | 1.25 | 90 | 8 | 0.9 | 0.0 |
| 90 | 10 | 1.40 | 500 | N.B. | — | — |
| All Tobacco | | 1.10 | 70 | 10.0 | 28.7 | 24.7 |

*Non-Burnable

EXAMPLE III

As noted earlier, in some systems it is desirable to utilize two or more fillers to bring the smouldering rate of the system to an optimum value. In the present example, the smouldering rate of a carboxymethyl cellulose-dolomitic limestone system was modified by the inclusion of a second particulate filler, titanium dioxide. The three components were formed into a film and converted into cigarettes as described in Example I. The results set forth in Table 3 were obtained upon smoking the cigarettes in the manner previously described.

TABLE 3

| % CMC | % DOLOMITE | % TiO$_2$ | PUFF COUNT |
|---|---|---|---|
| 40 | 60 | — | Did Not Burn |
| 40 | 40 | 20 | 9 |

EXAMPLE IV

Data on the amount of organic components in the gas phase was determined by gas chromatography for a synthetic material consisting of a film comprised of 37 carboxymethyl cellulose, 37% dolomitic limestone, 10% carbon, and 16% wetting agent, plasticizer and colorants; for a 50–50 blend of tobacco and the film; for a 50–50 blend of tobacco and the synthetic material in dry admixture. Table 4 contains the results obtained in $\mu$g/puff.

TABLE 4

| | All Tobacco Control | 50/50 Film Formed | 50/50 Dry Mixed | 100% Film Formed |
|---|---|---|---|---|
| Methanol | 12.8 | 5.7 | 5.9 | 0.0 |
| Acetaldehyde | 47.8 | 46.7 | 34.9 | 39.5 |
| Acetonitrile | 16.6 | 8.6 | 6.1 | 0.2 |
| Acrolein | 5.8 | 4.3 | 3.8 | 1.8 |
| Furan | 3.1 | 1.9 | 1.45 | 0.7 |
| Propionaldehyde | 4.1 | 5.6 | 2.0 | 4.2 |
| Acetone | 28.2 | 22.4 | 15.8 | 7.1 |
| Propionitrile | 2.7 | 1.1 | 0.8 | 0.01 |
| Isobutylaldehyde | 2.2 | 1.3 | 1.0 | 0.3 |
| Benzene | 7.1 | 4.8 | 2.7 | 1.3 |

The hydrogen cyanide, phenol, carbon monoxide, and benzpyrene values for the above synthetic films were also determined utilizing conventional techniques. The data obtained is contained in Table 4 (a).

TABLE 4(a)

| Sample | Cyanide ug/cig. | Phenol ug/cig. | Carbon Monoxide (vol.%) | Benzpyrene (ug/100 cig) |
|---|---|---|---|---|
| 100% Synthetic Film | 5 | 3 | 1.7 | 1.1 |
| 50% Film + 50% Tobacco Shred | 83 | 39 | 3.1 | 2.4 |
| All Tobacco | 225 | 63 | 3.8 | 2.4 |

As noted above, the carbon monoxide level was only 1.7 volume percent for the 100% synthetic film. Generally, the present compositions, and particularly those compositions containing dolomite or similar fillers, will deliver less than 2 volume percent of carbon monoxide. While not wishing to be held to any particular theory, it is believed that this reduction is at least partially attributable to the fact that these compositions have a lower peak temperature upon combustion that does tobacco. Notably, the carbonates undergo an endothermic decomposition in the region of smoking temperatures and thus may be preferred for this purpose.

EXAMPLE V

In order to demonstrate the effect upon organic gas phase and tar values when using the components of the present material alone and in combination, the following compositions were prepared in conventional cigarette form.

| Sample | % Tobacco | % Carboxymethyl cellulose | % Dolomitic limestone | Form of Synthetic Material |
|---|---|---|---|---|
| A | 50 | 25 | 25 | Dry Mixture |
| B | 67 | 33 | — | Dry Mixture |
| C | 67 | — | 33 | Dry Mixture |
| D | 100 | — | — | |
| E | 50 | 25 | 25 | CMC and Dolomite in film mixed with tobacco shred |
| F | 50 | 25 | 25 | All ingredients in film (reconstituted type materials) |

Wet and dry tar values were determined by the procedure described in earlier examples. The results obtained are set forth in Table 5.

TABLE 5

| Sample | Shred Wgt. g | Pressure Drop mm H$_2$O | Puff Count | Wet Tar mg/cig. | Dry Tar mg/cig. |
|---|---|---|---|---|---|
| A | 1.10 | 40 | 11.8 | 15.4 | 13.7 |
| B | 1.10 | 50 | 14.4 | 19.2 | 17.6 |
| C | 1.10 | 66 | 8.0 | 21.5 | 16.8 |
| D | 1.10 | 70 | 10.0 | 28.7 | 24.8 |
| E | 1.10 | 36 | 10.9 | 16.5 | 12.0 |
| F | 1.10 | 25 | 7.6 | 22.5 | 19.7 |

The data on the organic gas phase components in µg/puff is set forth in Table 5 (a).

TABLE 5 (a)

| | (A) | (B) | (C) | (D) | (E) | (F) |
|---|---|---|---|---|---|---|
| Acetaldehyde | 27.2 | 34.2 | 53.4 | 47.8 | 5.1 | 40.5 |
| Acetonitrile | 5.0 | 6.9 | 18.5 | 16.6 | 7.5 | 6.5 |
| Acrolein | 2.5 | 2.7 | 7.5 | 5.8 | 4.0 | 3.5 |
| Furan | 1.1 | 1.5 | 3.4 | 3.1 | 1.7 | 1.6 |
| Propionaldehyde | 1.8 | 3.1 | 4.8 | 4.1 | 2.7 | 3.3 |
| Acetone | 15.6 | 21.4 | 28.9 | 28.2 | 0.3 | 19.3 |
| Propionitrile | 0.9 | 1.3 | 2.9 | 2.7 | 1.2 | 1.4 |
| Isobutyaldehyde | 0.8 | 1.2 | 3.6 | 2.2 | 1.3 | 1.3 |
| Benzene | 3.4 | 4.1 | 7.5 | 7.1 | 3.5 | 3.5 |

Three facts are readily apparent from the above date. First, the values obtained with the blends comprising a combination of the two components of the present invention with tobacco are noticeably lower than the values from tobacco alone. Second, use of the combustible material and the filler material in combination yields lower values than those obtained when using these materials separately in tobacco blends. In fact, it will be noted from the above data that the use of the filler material alone produces generally higher organic gas phase values. Third, the data in Table 5 indicates that lower tar values are obtained by using the film and tobacco shred in physical admixture (E) than are obtained when the tobacco is incorporated into the film (F).

EXAMPLE VI

A synthetic composition similar to that described in Example V was prepared by combining 14 parts of carboxymethyl cellulose (0.7 D. S.) with 14 parts of dolomitic limestone and 10 parts of magnesium oxide. The composition exhibited very desirable smouldering properties and yielded amounts of components comparable to those shown for the synthetic composition of Example V.

EXAMPLE VII

Other suitable formulations were prepared by incorporating tobacco extract in a film made by combining the following ingredients:

| | |
|---|---|
| 0.2 | guar gum |
| 2.5g | CMC |
| 3.0g | Magnesium Oxide |
| 1.0g | RA Grade High Alpha cellulose pulp |
| 5 drops | Germitol (wetting agent) |

The tobacco extract used was an alcoholic extract of burley leaves. Utilizing 3.0g of extract, the material in 100% cigarette form had a puff count of 8 on a 60 second cycle and yielded a smoke of very satisfactory taste and aroma. When only 1.5g of extract were used, the puff count was increased to 9.5 on a 60 second cycle. Satisfactory products were also obtained when these formulations were blended with an equal amount of tobacco.

EXAMPLE VIII

A suitable substitute was prepared by forming a film of the following ingredients in the manner previously described:

| MATERIAL | PARTS | % ADDED |
|---|---|---|
| Carboxymethyl Cellulose | 12 | 33 |
| Dolomitic Limestone | 12 | 33 |
| Diatomaceous Earth | 10 | 28 |
| Carbon | 0.4 | 1.1 |
| Wetting Agent | 0.6 | 1.7 |
| Glycerine | 0.6 | 1.7 |
| Wet Strength Resin | 1.2 | 3.3 |
| Food Colors | 0.18 | 0.50 |

Data were compiled in the manner also previously described and the following results were obtained:

|  | 100% SYNTHETIC MATERIAL | 100% TOBACCO |
|---|---|---|
| Selected cigarette weight grams | 1.20±0.3 | 1.20±0.3 |
| Average cigarette pressure drop mm water (range) | 41 (38–45) | 63 (54–72) |
| Puff Count | 7.3 | 9.6 |
| Wet Particulate Matter mg/cig. | 2.8 | 28.0 |
| Dry Particulate Matter mg/cig. | 1.7 | 24.7 |
| Nicotine Delivery mg/cig. | <0.01 | 1.52 |
| Cyanide Delivery, as $\mu$g HCN/cig. | 1.4 | 216 |
| Benzo (a) pyrene delivery $\mu$g/100 cig. | 1.2 | 2.8 |
| Phenol Delivery, $\mu$g/cig. | <4 | 98 |
| Carbon Monoxide in smoke, Vol.% | 1.5 | 3.6 |
| Methyl Alcohol, $\mu$g/puff | 1.4 | 22 |
| Acetaldehyde, $\mu$g/puff | 41.5 | 52.8 |
| Acetonitrile, $\mu$g/puff | 0.7 | 15.0 |
| Acrolein, $\mu$g/puff | 3.2 | 4.9 |
| Furan, $\mu$g/puff | 0.7 | 1.9 |
| Propionaldehyde, $\mu$g/puff | 2.9 | 4.2 |
| Acetone, $\mu$g/puff | 14.3 | 28.0 |
| Propionitrile, $\mu$g/puff | 0.0 | 2.8 |
| Isobutyraldehyde, $\mu$g/puff | 0.4 | 2.6 |
| Benzene, $\mu$g/puff | 1.5 | 5.6 |

EXAMPLE IX

A formulation was prepared by combining 6 g of high viscosity potassium carboxymethylcellulose with 8 g of dolomite and 11 g of diatomaceous earth in water. Minor amounts of carbon, dyes, a humectant and a cross-linking agent were added and a film was prepared. This film was then shredded and cigarettes formed therefrom. These cigarettes were smoked on an apparatus that took 35 ml. puffs over a 2-second interval on a 60-second cycle. Tar weight was obtained by drawing the smoke from the cigarettes through a Cambridge filter pad and weighing the pad before and after smoking. Puff count is defined as the number of puffs required to smoke the cigarette to a 30 mm butt length. The following results were obtained.

|  | Puff Count | Wet Tar | Dry Tar |
|---|---|---|---|
| KCMC | 5.8 | 3.2 | 2.5 |
| Tobacco | 10 | 28.7 | 24.7 |

EXAMPLE X 12 g of sodium carboxymethyl cellulose was combined in 120 ml of water with 11 g of dolomite and 13 g of diatomaceous earth. The sodium carboxymethyl cellulose was then reacted with 0.22 g of aluminum chloride hexahydrate ($AlCl_3 \cdot 6H_2O$) to produce aluminum carboxymethylcellulose. The mixture was cast to form a film. This film was shredded and formed into cigarettes and tested in the manner of Example X. The following results were obtained.

|  | Puff Count | Wet Tar | Dry Tar |
|---|---|---|---|
| ALCMC | 8.8 | 9.6 | 7.8 |
| Tobacco | 10.0 | 28.7 | 24.7 |

EXAMPLE XI

A film similar to that described in Example IX was prepared substituting calcium carboxymethyl cellulose for the potassium carboxymethyl cellulose. This film when smoked in cigarette form yielded the following data.

|  | Puff Count | Wet Tar | Dry Tar |
|---|---|---|---|
| CaCMC | 7.5 | 11.6 | 9.0 |
| Tobacco | 10.0 | 28.7 | 24.7 |

EXAMPLE XII

A film similar to that described in Example IX was prepared by combining 7.0 g of ferric carboxymethylcellulose with 8 g dolomite and 8 g diatomaceous earth along with minor amounts of a humectant, carbon and colorants. The following results were obtained upon smoking.

|  | Puff Count | Wet Tar | Dry Tar |
|---|---|---|---|
| FeCMC | 7.4 | 9.3 | 7.4 |
| Tobacco | 10.0 | 28.7 | 24.7 |

EXAMPLE XII

A film similar to that of Example XIII was prepared by employing 8 g of magnesium carboxymethylcellulose with 12 g of dolomite and 11 g of diatomaceous earth. The film was shredded and combined with a shredded film comprised of 12 g of sodium carboxymethylcellulose, 12 g dolomite and 13 g diatomaceous earth. The mixture yielded the following data upon smoking.

EXAMPLE XIV

24 G hydroxyethyl (potato) starch was combined with 24 g dolomite, 22 g diatomaceous earth, and minor amounts of glycerine, food colors, and wet strength resin. A film was prepared therefrom and was smoked and the following data obtained.

|  | Puff Count | Wet Tar | Dry Tar |
|---|---|---|---|
| Superlose 500 | 7.1 | 17.7 | 14.6 |
| Tobacco | 10.0 | 28.7 | 24.7 |

EXAMPLE XV

6 G of potato starch was combined with 12 g of sodium carboxymethylcellulose, 12 g dolomite, 11 g diatomaceous earth, and minor amounts of a humectant, carbon, and food colors. Smoking of cigarettes prepared from the shredded film produced the following data.

|  | Puff Count | Wet Tar | Dry Tar |
|---|---|---|---|
| Superlose 810 | 8.4 | 9.6 | 7.8 |
| Tobacco | 10.0 | 28.7 | 24.7 |

EXAMPLE XVI

A formulation similar to that of Example XV was prepared eliminating the potato starch and substituting perlite, a potassium sodium aluminum silicate, for the dolomite. The following data was obtained upon smoking of the shredded film.

|  | Puff Count | Wet Tar | Dry Tar |
|---|---|---|---|
| Perlite | 6.2 | 8.0 | 6.1 |
| Tobacco | 10.0 | 28.7 | 24.7 |

EXAMPLE XVII

A film similar to that of Example XVI was prepared substituting 6 g of sodium silicate for the perlite and the diatomaceous earth content was increased to 15 g. The following data was obtained.

|  | Puff Count | Wet Tar | Dry Tar |
|---|---|---|---|
| Sodium Silicate | 8.6 | 10.1 | 8.0 |
| Tobacco | 10.0 | 28.7 | 24.7 |

EXAMPLE XVIII

8 G of sodium carboxymethylcellulose was combined with 4 g of sodium alginate, 11 g dolomite, 13 g diatomaceous earth, and minor amounts of a humectant, a wet strength resin, carbon, and food colors in 145 ml water and a film was cast therefrom. This film, when shredded and smoked in cigarette form yielded the following data.

|  | Puff Count | Wet Tar | Dry Tar |
|---|---|---|---|
| Sodium alginate | 10.8 | 5.3 | 4.1 |
| Tobacco | 10.0 | 28.7 | 24.7 |

EXAMPLE XIX

12 G of methyl cellulose was combined with 12 g dolomitic limestone and 15 g diatomaceous earth along with minor amounts of a humectant and coloring. A film was cast and cigarettes prepared from shredded film. These cigarettes produced 20.2 mg wet tar/cigarette or 16.9 mg dry tar/cigarette upon smoking.

EXAMPLE XX

Films were prepared in the manner of Example XIX except that carboxymethyl hydroxyethyl was substituted for the methyl cellulose. These cigarettes yielded 6.3 mg wet tar/cigarette or 4.9 mg dry tar/cigarette.

EXAMPLE XXI

A shredded film was prepared in the manner of Example XXI except that hydroxyethyl cellulose was substituted for the methyl cellulose. Cigarettes prepared yielded 7.8 mg wet tar/cigarette or 6.7 mg dry tar/cigarette.

EXAMPLE XXII 12.0 G of sodium carboxymethyl cellulose was combined with 12.0 g of zinc oxide and 15 g diatomaceous earth along with minor amounts of a humectant, a cross-linking agent and colorants. These cigarettes yielded 8.5 mg wet tar/cigarette or 6.6 dry tar/cigarette upon smoking.

EXAMPLE XXII–XXVII

Formulations were prepared by combining 6 g low molecular weight sodium carboxymethyl cellulose, 2 g high molecular weight sodium carboxymethyl cellulose, 12 g dolomite, 11 g diatomaceous earth, and minor amounts of coloring agents and a humectant with the hereinbelow specified percentages of tobacco dust by intimately mixing in water and then casting the mixture to produce a film. These films are shredded and formed into cigarettes which were tested for tar delivery, and also the delivery of organic components in the gas phase, the latter being performed by gas chromatography. The data given below was obtained. Tar values are in mg/cigarette. Gas phase values are in $\mu$/cigarette.

| EXAMPLE | | XXIV | XXV | XXVI | XXVII | |
|---|---|---|---|---|---|---|
| % Tobacco Dust | | 0 | 5 | 15 | 25 | 35 |
| Cigarette Weight | (grams) | 1.2 | 1.2 | 1.2 | 1.6 | 1.6 |
| Puff Count | | 6.5 | 6.3 | 6.1 | 8.3 | 8.8 |
| Wet Tar | (mg/cigt.) | 4.3 | 8.0 | 11.3 | 13.8 | 17.3 |
| Dry Tar | (mg/cigt.) | 3.2 | — | 9.3 | 11.8 | 15.0 |
| Methanol | ($\mu$g/puff) | 0.2 | 1.3 | 2.2 | 3.5 | 7.3 |
| Acetaldehyde | (") | 29.6 | 42.7 | 45.4 | 46.7 | 45.9 |
| Acetonitrile | (") | 0.3 | 1.5 | 3.1 | 5.0 | 6.4 |
| Acrolein | (") | 1.3 | 2.2 | 3.0 | 3.7 | 3.8 |
| Furan | (") | 1.3 | 2.6 | 2.8 | 2.4 | 2.0 |
| Propionaldehyde | (") | 1.2 | 2.4 | 2.8 | 3.2 | 3.1 |
| Acetone | (") | 11.9 | 17.7 | 19.9 | 21.9 | 22.3 |
| Propionitrile | (") | <0.3 | <0.8 | <1.6 | <2.3 | <2.6 |
| Iso-butraldehyde | (") | 0.2 | 0.5 | 0.9 | 1.3 | 1.5 |
| Benzene | (") | 2.7 | 3.8 | 4.5 | 5.4 | 5.3 |
| 2,5-dimethyl furan | (") | <1.4 | <3.2 | <6.8 | <12.0 | <20.7 |
| 2-pentanone | (") | <0.8 | <1.8 | <3.8 | <6.8 | <11.6 |
| Toluene | (") | 3.8 | 7.6 | 12.1 | 16.1 | 15.9 |

EXAMPLES XXVIII–XXXVIII

Additional formulations were prepared by intimately mixing in water the materials given below in the percentages noted. In some instances these percentages are slightly less than 100% due to the presence of minor amounts of a humectant, cross-linking agents and/or coloring agents. These materials were also cast as a film and was shredded and formed into cigarettes. The cigarettes were tested for tar delivery and puff count. These values are given in the following table.

| EXAMPLE | XXVIII | XXIX | XXX | XXXI | XXXII | XXXIII | XXXIV | XXXV | XXXVI | XXXVII | XXXVIII |
|---|---|---|---|---|---|---|---|---|---|---|---|
| Sodium Carboxy-Methyl Cellulose | 33.4 | 30.4 | 43.5 | 35.5 | 39.8 | 33.4 | 33.4 | | 62.5 | | |
| Carboxymethyl Hydroxyethyl Cellulose | | | | | | | | 25.0 | | 50.0 | |
| Hydroxyethyl Cellulose | | | | | | | | | | | 50.0 |
| Dolomite | | 30.4 | 43.5 | 35.5 | 39.8 | | | | | | |
| Diatomaceous Earth | 27.8 | 25.3 | | | | 27.8 | 27.8 | 75.0 | | | 50.0 |
| Calcium Aluminate | | | | 25.3 | | | | | | | |
| Silica Alumina | | | | | 11.4 | | | | | | |
| Aluminum Oxide | 33.4 | | | | | | | | | | |
| Ferric Oxide | | 9.07 | | | | | | | | | |
| Magnesium Oxide | | | 9.30 | | | | | | 12.5 | | |
| Titanium Dioxide | | | | | | | | | | 50.0 | |
| Calcium Carbonate | | | | | | 33.4 | | | 25.0 | | |
| Wet Tar | 2.7 | 2.6 | 11.5 | 11.7 | 15.9 | 2.1 | 3.8 | 2.3 | 2.5 | 9.3 | 11.7 |
| Dry Tar | 1.9 | 1.5 | NT* | NT | NT | 0.8 | 2.0 | 1.4 | NT | NT | NT |
| Puff Count | 10.9 | 6.5 | 10.8 | 9.3 | 9.8 | 6.7 | 7.5 | 5.0 | 12.6 | 5.6 | 4.2 |

*Not Tested

Interestingly, it is observed in testing of the materials in the present invention that the peak particle size in the smoke aerosol obtained by combustion of these materials ranges from about 0.1 to 0.2 microns. In comparison, the peak particle size in tobacco smoke is from about 0.2 to 0.3 microns. In view of the difference in particle size of the present material, optimum filtration may be attained utilizing a filter adapted to remove smoke stream particles having the above specified peak particle size. It has also been noted that the smoke obtained upon combustion of the presently claimed material contains only about 100 million particles/cc as compared to about 1 billion particles/cc in tobacco smoke.

The materials and composite structure described hereinabove in smoking composition form have been shown to exhibit particular advantages residing in the reduction of the delivery of selected known or suspected deleterious matter in cigarette smoke, when tested in cigarette form as detailed hereinabove. While some studies, notably the Surgeon General's Report, Public Health Service Publication No. 1103, would indicate the desirability of these results as a possible means to reduce the incidence of certain forms of cancer which may be related to cigarette smoking, it should be emphasized that there is no similar degree of evidence linking such performance to the incidence of other diseases possibly related to cigarette smoking such as emphysema, heart disease, etc.

While the synthetic materials of the present invention have been described primarily as used in cigarette form, it will be obvious that they are also readily usable in cigars, pipe tobacco, etc. Also the compositions may be processed by paper making procedures and used for cigarette papers, etc. It will also be apparent that a portion of the combustible material herein defined may be substituted with other known combustible materials to obtain a smokable product.

Obviously, many modifications and variations of the invention as hereinbefore set forth may be made without departing from the spirit and scope thereof, and therefore, only such limitations should be imposed as are indicated in the appended claims.

I claim:

1. A smoking material comprising a combustible organic ingredient and a particulate inorganic filler, the major proportion of said combustible organic ingredient being a material selected from the group consisting of film-forming cellulose derivatives, their salts and mixtures thereof having the recurring anhydroglucose unit:

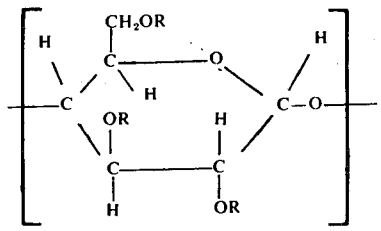

wherein at least one R is selected from the group consisting of lower alkyl, carboxy lower alkyl, hydroxy lower alkyl groups and mixtures thereof; and the remaining Rs are hydrogen and the average degree of substitution is from about 0.2 to 3.0; said major portion of said combustible organic ingredient and said particulate inorganic filler being present in a weight to weight ration of about 15:85 to 85:15.

2. The smoking material of claim 1 wherein said major proportion of said combustible organic ingredient is selected from the group consisting of carboxymethyl cellulose, carboxymethyl cellulose salts, carboxyethyl cellulose, hydroxyethyl cellulose, hydroxypropyl cellulose, carboxymethyl hydroxyethyl cellulose and mixtures thereof and said particulate inorganic filler is selected from the group consisting of titanium dioxide, magnesium oxide, silica gel, sodium silicate, sodium alginate, zinc oxide, aluminum oxide, ferric oxide, calcium aluminate, silica aluminate, calcium carbonate, diatomaceous earth, dolomite, carbon, perlite, magnesite, zeolite, vermiculite and mixtures thereof.

3. The smoking material of claim 2 wherein said major proportion of said combustible organic ingredient is selected from the group consisting of carboxymethyl cellulose, carboxymethyl cellulose salts, and mixtures thereof.

4. The smoking material of claim 3 wherein said particulate inorganic filler comprises perlite.

5. The smoking material of claim 3 wherein said particulate inorganic filler comprises dolomite.

6. The smoking material of claim 2 wherein said particulate inorganic filler is selected from the group consisting of dolomite, perlite, diatomaceous earth, carbon and mixtures thereof.

7. The smoking material of claim 6 wherein said major proportion of said combustible organic ingredient is sodium carboxymethyl cellulose.

8. A smoking material comprising a combustible organic ingredient wherein the major proportion of said combustible organic ingredient is sodium carboxymethyl cellulose and a particulate inorganic filler comprising perlite and dolomite said sodium carboxymethyl cellulose and said particulate filler being present in a weight to weight ratio of from about 85:15 to 15:85.

9. The smoking material of claim 1 in film form.

10. A smoking material comprising a combustible organic material and a particulate inorganic filler, said combustible organic material consisting essentially of one or more cellulose derivatives, their salts and mixtures thereof having the recurring anhydroglucose unit:

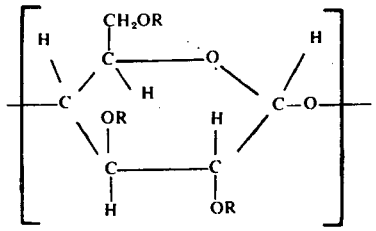

wherein at least one R is selected from the group consisting of lower alkyl, carboxy lower alkyl, hydroxy lower alkyl groups and mixtures thereof; and the remaining Rs are hydrogen and the average degree of substitution is from about 0.2 to 3.0; said combustible organic material and said particulate inorganic filler being present in a weight to weight ratio of from about 85:15 to about 15:85.

11. The smoking material of claim 10 wherein said combustible organic material is selected from the group consisting of carboxymethyl cellulose, carboxymethyl cellulose salts, carboxyethyl cellulose, hydroxyethyl cellulose, methyl cellulose, ethyl cellulose, hydroxypropyl cellulose, carboxymethyl hydroxyethyl cellulose and mixtures thereof and said particulate inorganic filler is selected from the group consisting of titanium dioxide, magnesium oxide, silica gel, sodium silicate, sodium alginate, zinc oxide, aluminum oxide, ferric oxide, calcium aluminate, silica aluminate, calcium carbonate, diatomaceous earth, dolomite, carbon, perlite, magnesite, zeolite, vermiculite and mixtures thereof.

12. The smoking material of claim 10 wherein said combustible organic material is selected from the group consisting of carboxymethyl cellulose, carboxymethyl cellulose salts, and mixtures thereof.

13. The smoking material of claim 12 wherein said particulate inorganic filler comprises perlite.

14. The smoking material of claim 12 wherein said particulate inorganic filler comprises dolomite.

15. The smoking material of claim 11 wherein said particulate inorganic filler is selected from the group consisting of dolomite, perlite, diatomaceous earth, carbon and mixtures thereof.

16. The smoking material of claim 15 wherein said combustible organic material is sodium carboxymethyl cellulose.

17. The smoking material of claim 10 in film form.

18. A smoking material comprising a combustible organic material and a particulate inorganic filler wherein said combustible organic material consists essentially of sodium carboxymethyl cellulose; said particulate inorganic filler comprises dolomite and perlite; and said combustible organic material and said particulate inorganic filler are present in a weight to weight ration of from about 85:15 to about 15:85.

19. A smokable product comprising a film in shred form comprising a combustible organic material and a particulate inorganic filler, said combustible organic material consisting essentially of one or more cellulose derivatives, their salts and mixtures thereof having the recurring anhydroglucose unit:

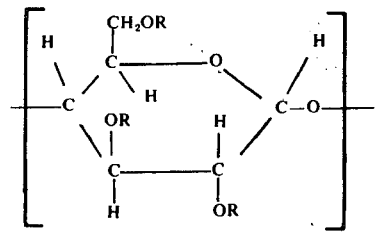

wherein at least one R is selected from the group consisting of lower alkyl, carboxy lower alkyl, hydroxy lower alkyl groups and mixtures thereof; and the remaining Rs are hydrogen and the average degree of substitution is from about 0.2 to 3.0; said organic material and said particulate inorganic filler being present in a weight to weight ration of about 15:85 to 85:15.

* * * * *

UNITED STATES PATENT OFFICE
CERTIFICATE OF CORRECTION

Patent No. 3,931,824      Dated January 13, 1976

Inventor(s) Ralph R. Miano; Charles H. Keith

It is certified that error appears in the above-identified patent and that said Letters Patent are hereby corrected as shown below:

Column 9, in line 47 the number

- - 35.1 - - should be inserted in the blank space after the number "47.8"; between lines 47 and 48 the number "5.1" should be deleted;

in line 52 the number

- - 20.3 - - should be inserted in the blank space after the number "28.2"; between lines 52 and 53 the number "0.3" should be deleted.

Signed and Sealed this thirteenth Day of April 1976

[SEAL]

Attest:

RUTH C. MASON
*Attesting Officer*

C. MARSHALL DANN
*Commissioner of Patents and Trademarks*